United States Patent
Kasai et al.

(10) Patent No.: US 8,552,331 B2
(45) Date of Patent: Oct. 8, 2013

(54) METHOD AND SYSTEM FOR PRODUCING CONTACT MATERIAL BEING EMPLOYED IN ELECTRIC/ELECTRONIC CIRCUIT

(75) Inventors: Yoshiaki Kasai, Yokohama (JP); Kiyoshi Takizawa, Yokosuka (JP)

(73) Assignee: Sept. 1 Co., Ltd., Yokohama-shi, Kanagawa (JP)

(*) Notice: Subject to any disclaimer, the term of this patent is extended or adjusted under 35 U.S.C. 154(b) by 1562 days.

(21) Appl. No.: 11/661,994

(22) PCT Filed: Nov. 19, 2004

(86) PCT No.: PCT/JP2004/017273
§ 371 (c)(1),
(2), (4) Date: Mar. 6, 2007

(87) PCT Pub. No.: WO2006/054356
PCT Pub. Date: May 26, 2006

(65) Prior Publication Data
US 2008/0087649 A1    Apr. 17, 2008

(30) Foreign Application Priority Data
Nov. 19, 2004 (WO) .................. PCT/JP2004/017273

(51) Int. Cl.
*B23K 11/00* (2006.01)
*H05B 3/00* (2006.01)
*B23K 11/20* (2006.01)
*B23K 11/30* (2006.01)

(52) U.S. Cl.
CPC .............. *H05B 3/0028* (2013.01); *B23K 11/20* (2013.01); *B23K 11/3081* (2013.01)
USPC .................. 219/78.02; 219/78.01; 219/79

(58) Field of Classification Search
USPC ............... 219/78.02, 81, 83, 84; 73/827
See application file for complete search history.

(56) References Cited

U.S. PATENT DOCUMENTS

| | | | | |
|---|---|---|---|---|
| 4,292,852 A | * | 10/1981 | Morris | 73/827 |
| 4,780,589 A | * | 10/1988 | Davies | 219/84 |
| 4,907,458 A | * | 3/1990 | Biggs et al. | 73/827 |
| 5,796,065 A | | 8/1998 | Fujiyoshi et al. | |
| 6,350,533 B1 | * | 2/2002 | Goto et al. | 428/615 |
| 2002/0007683 A1 | * | 1/2002 | Garde et al. | 73/850 |

FOREIGN PATENT DOCUMENTS

| | | |
|---|---|---|
| JP | 2/299187 | 12/1990 |
| JP | 6/170548 | 6/1994 |
| JP | 9/106874 | 4/1997 |
| JP | 2000/312976 | 1/2000 |

* cited by examiner

*Primary Examiner* — Tu B Hoang
*Assistant Examiner* — Thien S Tran
(74) *Attorney, Agent, or Firm* — James Creighton Wray

(57) ABSTRACT

A method for producing contact materials being employed in electric/electronic circuits consists of a step 1-1 for supplying a spring base strip 1, a step 2-1 for supplying a noble metal wire 2, a seam welding step 3-1 for welding the metal wire 2 to the spring base strip after the spring base strip 1 and the noble metal wire 2 are held together, and a step 4-1 for winding a welded product. The method further includes a testing step 8-1 for determining a preciseness of a welded position and for determining a welded strength to peel the noble metal wire 2 from the spring base strip 1, which are performed between the seam welding step 3-1 and the winding step 4-1. Specimens for the testing step 8-1 are sampled at the beginning of and at the end of a production lot of the contact material.

2 Claims, 6 Drawing Sheets

METHOD AND SYSTEM FOR PRODUCING CONTACT MATERIAL BEING EMPLOYED IN ELECTRIC/ELECTRONIC CIRCUIT

This application claims the benefit of PCT/JP2004/017273 filed Nov. 19, 2004, which is hereby incorporated by reference in its entirety.

FIELD OF INVENTION

The present invention relates to a method and a system for producing contact members used for various contact parts employed in electric/electronic circuits.

RELATED BACKGROUND ARTS

Such contact members combined with printed resistances are used as sliding contacts and the like in electric/electronic circuits, so that particular mechanical properties such as springy characteristics, abrasion resistances and the like are required in order to keep electrical properties such as contact resistances and the like being stable when the sliding contacts are slid. For that purpose, it is desirable to employ noble metal members bearing less contact resistances and excellent abrasion resistances as such contact members. However, the noble metal members are usually welded only to contacts points on spring members used as base members in order to minimize costs of the contact members.

The contact points constituted in the above-mentioned way are formed into shapes being fitted to parts. Since it is essential that contact points are formed at the desired positions in order to ensure excellent contact performance and reliability between the contact points and the parts, it is required to weld noble metal wires precisely (within errors of ±0.2mm) on positions of the base members.

In presently widely used apparatuses equipped with seam welders, heat generated during welding steps cannot be properly controlled, so that defects such as deposits from works on electrodes, dust, burr, spatter, insufficient strength in welded portions, fluctuations of welded positions and the like are caused. Since appropriate measures against the generated heat are not taken, sufficiently precise welded semi-products required for succeeding steps such as slitting steps, stamping steps and the like cannot be obtained. In order to ensure the sufficiently precise welded semi-products, guiding holes are formed on the spring (base) materials, as a result a more complicated mechanism is required in a production apparatus. Consequently, a production rate, namely, a welding speed of merely ca. 3 m/H is obtained, so that high production costs are inevitable.

In order to produce highly reliable contact members at lower costs used as the electric/electronic parts such as sliding contacts and the like, noble metal wires and base metal hoops are welded at desired positions by a seam welding method. In this method, a spring member and a noble metal wire are welded as being held by upper/lower rotating electrodes. However, since energy supplied for welding flows to the electrodes, so that the electrodes are heated, which causes defects in welded portions.

In order to cool the heated lower rotating electrode, the electrode is partially immersed in cooling water, so that the upper electrode is indirectly cooled by welded materials cooled by the lower electrode (for example, see Ref. 1: Japanese laid open patent No. 9-106874).

DISCLOSURE OF THE INVENTION

Problems to be Solved by the Invention

However, in the invention disclosed by Ref. 1, it is possible that the cooling water for the lower electrode might contaminate the welded portions when the water was trapped there, and a contacting state between a welded portion and the upper electrode is changed, so that cooling effects of the electrodes are changed. As a result, since welding operations become unstable, a desired preciseness and a sufficient strength in welded portions cannot be obtained.

In such welded products, data for evaluating the welded strength are required. Usually peeling test data are used for that purpose. However, since some noble metal wires are highly brittle, the wires themselves are ruptured before the peeling test, so that appropriate data for evaluating the welded strength cannot be obtained. Therefore, appropriate methods and machines for evaluating the welded strength are certainly required now in order to carry out sufficient quality controls.

It is desirable that the whole upper/lower rotating electrodes are cooled uniformly so as to obtain a predetermined welded strength when the noble metal wire is welded precisely to appropriate points on the base material.

The present invention is carried out in view of the above-mentioned problems in order to provide a method and a system for producing contact members of high quality used in electric/electronic circuits at lower costs. The system by the present invention employs a closed circular cooling means for cooling the upper/lower rotating electrodes uniformly at a predetermined temperature so as to obtain a sufficient preciseness of a welded position and a sufficient welded strength by stabilizing a seam welding operation. Further the present invention provides a method for evaluating the welded parts which are sampled as specimens at the beginning of and at the end in the same production lot.

Means to Solve the Problems

The above-mentioned problems are solved by the methods or apparatuses specified as follows.

(1) A method for producing a contact member being employed in electric/electronic circuits comprising a first process and a second process, the first process comprising steps of: supplying a spring base strip; supplying a noble metal wire; welding and combining the noble metal wire with the spring base strip by a seam welding utilizing upper/lower rotating electrodes as holding the supplied folded spring base strip and the noble metal wire between the upper and lower rotating electrodes; and winding a welded and combined product produced by the seam welding, and the second process comprising a step of punching the welded and combined product, wherein: the seam welding step comprises a step of setting welding conditions and a step of circulating chilled water in a closed channel with cooling water flowing through a through-hole of an upper housing of the upper rotating electrode and a through-hole perforated through a cooling shaft arranged as a rotating axis of the lower rotating electrode; and a testing step, which determines a preciseness of a welded position and a strength of the welded portion by a rupture test, is performed between the seam welding step and the winding step, wherein: the testing step comprises sub-steps of: sampling specimens having predetermined dimensions at the beginning of a production lot; determining the preciseness of the welded position and the strength of the welded portion by the rupture test; confirming the determined values fulfill predetermined standards; starting the production lot; sampling specimens having the predetermined dimensions at the end of the same production lot; determining the preciseness of the welded position and the strength of the welded portion by the rupture test; and confirming the determined values fulfill predetermined standards again.

(2) A system for producing a contact member being employed in electric/electronic circuits comprising: a spring base strip supplying means; a noble metal wire supplying means; a welding and combining means comprising upper/lower rotating electrodes employed as a seam welding machine for welding the noble metal wire to the spring base strip as holding the supplied folded spring base strip and the noble metal wire between the upper and lower rotating electrodes; a winding means for winding a welded and combined product produced by the seam welding machine, a punching means for punching the welded and combined product, and a testing means wherein: the welding and combining means comprises a setting means for setting welding conditions and a circulating means for circulating chilled water in a closed channel; the circulating means for circulating chilled water in the closed channel comprises: a closed pipeline for circulating chilled water via a through-hole formed in upper housing of the upper rotating electrode and a through-hole perforated through a cooling shaft arranged as a rotating axis of the lower rotating electrode, and a chilling unit; wherein: the testing means, which determine a preciseness of a welded position and a strength of a welded portion by a rupture test, is arranged between the welding and combining means and the winding means; and specimens having predetermined dimensions are sampled at the beginning of and at the end of a production lot for determining the preciseness of the welded position and the strength of the welded portion by the rupture test.

Effects Attained by the Invention

The present invention can provide the method and the system for producing contacts members of high quality used in electric/electronic circuits at lower costs. The method and the system can provide stable seam welding operations by employing the closed circular cooling means for cooling the upper/lower rotating electrodes uniformly at a predetermined temperature, so that a sufficiently preciseness of a welded position and a sufficient welded strength can be obtained. In addition, the evaluating method, which evaluates the welded parts sampled as specimens at the beginning of and at the end of the same production lot, is also provided by the present invention.

BRIEF DESCRIPTION OF THE DRAWINGS

FIG. 4(a) is a side view of the test machine and FIG. 4(b) is an enlarged partial view showing a test sample set on the test machine.

FIG. 7(a) is a plan view and FIG. 7(b) is a side view.

PREFERRED EMBODIMENT BY THE PRESENT INVENTION

Embodiments of the methods and system's by the present invention for producing the contact members used in electric/electronic circuits are explained in detail as referring to drawings.

Embodiment 1

Hereinafter, the method for producing the contact members is explained s referring to the block diagram in FIG.1.

Figure 1:
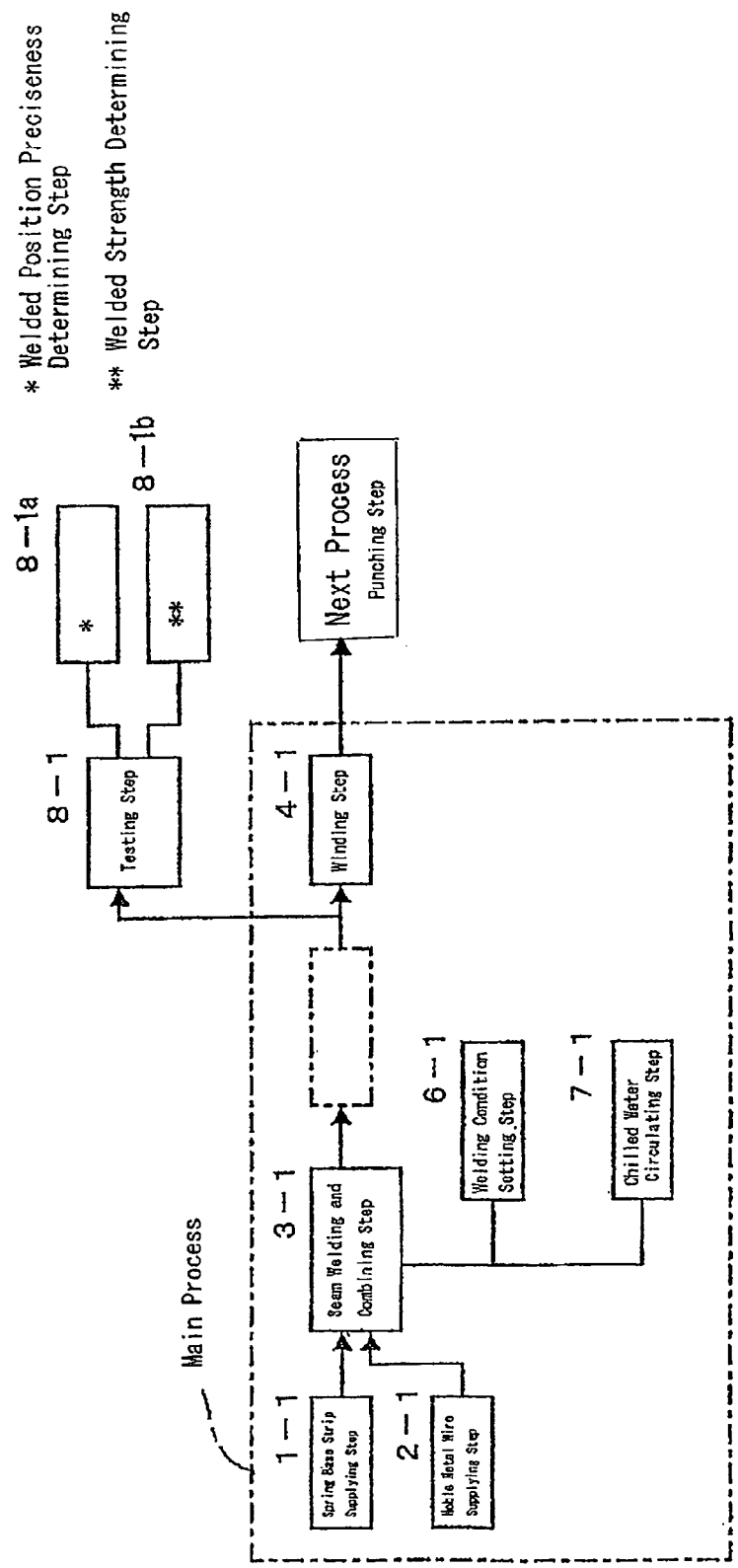
FIG. 1 is a block diagram showing a method by the present invention for producing contact members used in electric/electronic circuits.
Figure 2:
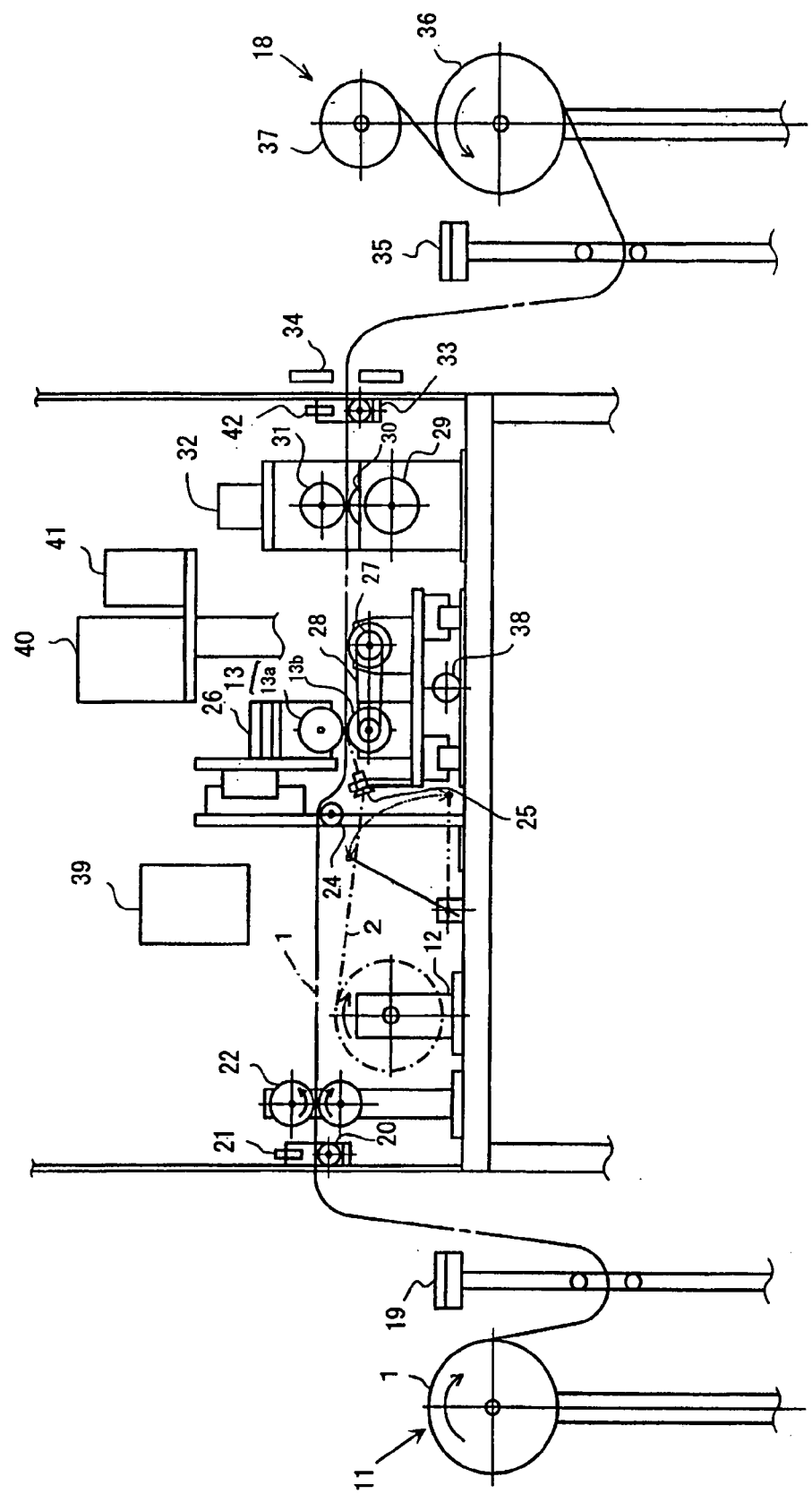
FIG. 2 is a schematic side view showing a system by the present invention for producing contact members used in electric/electronic circuits.

The block diagram in FIG.1 is the method for producing the contact materials used in electric/electronic circuits by holding, a spring base strip 1 and a noble metal wire welding them together (see FIG.2). The main process of the producing method comprises comprising a step 1-1 for supplying the spring base strip 1, a step 2-1 for supplying the noble metal wire 2, a seam welding step 3-1 for welding the noble metal wire 2 to the spring base strip 1 and combining them together and a step 4-1 for winding a welded product. The seam welding step 3-1 comprises a step 6-1 for setting welding conditions and a step 7-1 for circulating chilled water in a closed channel. Further a test step 8-1 can be performed after the seam welding step 3-1 but before the step 4-1 for winding the welded product. The test step 8-1 comprises a sub-step 8-1a for determining a preciseness of a welded position and a sub-step 8-1b for determining a welded strength.

Specimens having the predetermined dimensions for the test step 8-1 are sampled from the welded product at the beginning of and at the end of the same production lot and used for determining the preciseness of the welded position and the welded strength. After confirming the determined values from the specimens sampled at the beginning of the production fulfill predetermined standards, the production is resumed. And the specimens sampled at the end of the same production lot are used for confirming the determined values fulfill the predetermined standards.

Embodiment 2

Hereinafter, the system for producing the contact materials is explained as referring to the schematic side view in FIG. 2 and the closed chilled water circular cooling means in FIG. 3.

The schematic side view in FIG.2 is the system for producing the contact members used in electric/electronic circuits. The contact members are obtained by welding the noble metal wire 2 to the spring base strip 1after holding them together. The system comprises a spring base strip supplying means 11, a noble metal wire supplying means 12, a seam welding means 13 comprising upper/lower rotating electrodes 13a, 13b, a winding means (device) 18 for winding the welded (and combined) product. The seam welding means 13 further comprises a welding condition setting means and the closed chilled water circular cooling means.

Hereinafter, operations including a winding operation are explained as referring to FIG. 2.

The spring base strip 1 supplied from the spring base strip supplying means 11 is detected by a delivery sensor 19 and is led through between a lower guide 20 and an upper detecting sensor 21. Then the spring base strip 1 is delivered through rollers 22 for tensioning the spring base strip 1 via a guide 24 to the rotating electrodes 13 comprising the upper/lower rotating electrodes 13a, 13b, where the noble metal wire 2 is welded to the spring base strip 1. And the noble metal wire 2 is delivered from a wire delivery device 12 and supplied to the rotating electrode 13 via a detection sensor (not shown in the drawings) and a wire guide 25. At the rotating electrode 13, the noble metal wire 2 is supplied below the spring base strip 1 and welded to the spring base strip 1 by the seam welding method so as to form a semi-product 36 continuously. The semi-product 36 is delivered between a lower roller 30 driven by a motor 29 and a cylinder 32 which presses downward so as to tension the continuous semi-product 36. Then the semi-product 36 is led through between a guide 33 and a detection sensor 42. Further the semi-product 36 passes through a CCD camera 34 and a winding detection sensor 35 and finally the semi-product 36 is wound by the winding means 18 together with paper 37 which prevents semi-product 36 from being rubbed by itself. As explained in Embodiment 1, specimens for determining a position of the noble metal wire 2 welded to the spring base strip 1 are sampled at the beginning of a production lot and at the end of the same production lot. The sampled specimens are measured for determining the preciseness of the welded position of the noble metal wire on the spring base strip. Then the strength of the noble metal wire welded on the spring base strip is determined by a special test machine which will be explained later.

The lower rotating electrode 13b of the rotating electrodes 13 for the seam welding is rotated by a transmission belt 28 driven by a motor 27. The upper rotating electrode 13a is pressed downward against the lower electrode 13b by a pressurizing weight 26 in order to ensure better seam welding operations as pressing the spring base strip 1 and the noble metal wire 2 together.

A reference numeral "38" in FIG. 2 is a welding position determining motor, which is driven in accordance with a relative position between the spring base strip 1 and the noble metal wire 2. A reference numeral "39" is a transformer, a reference numeral "40" is a welding controller and a reference numeral "41" is a welding operation monitor.

Figure 3:
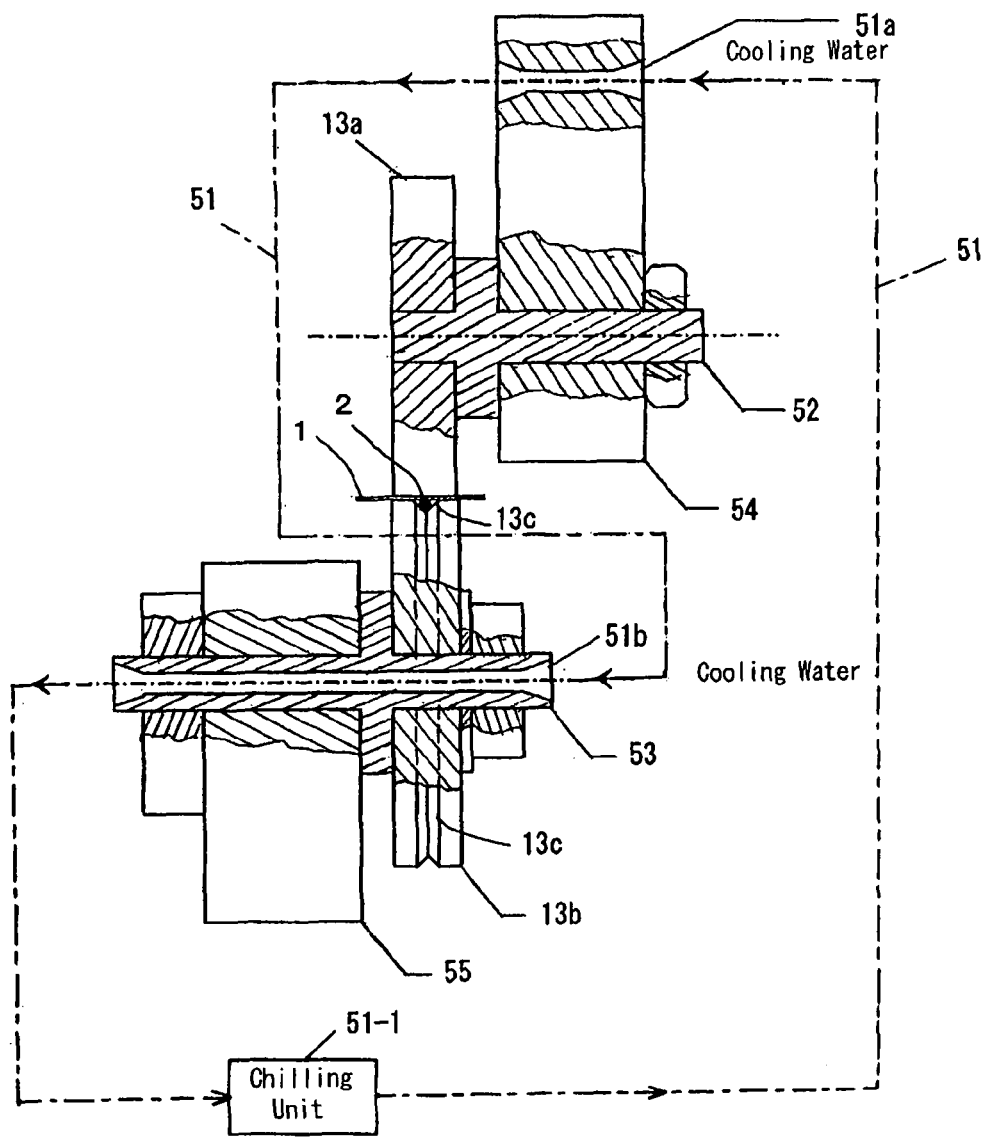
FIG. 3 is schematic view showing a closed chilled water circular cooling means by the present invention.

The closed chilled water circular means depicted in FIG. 3 comprises a closed chilled water circular channel 51 and a chilling unit 51-1. The closed chilled water circular channel 51 cools the upper/lower rotating electrodes 13a, 13b by circulating chilled water via through-holes 51a, 51b.

In order to eliminate contaminations and unstable cooling states caused by cooling water, the above-mentioned closed chilled water circular means is constituted such that the upper/lower rotating electrodes are indirectly cooled by the closed chilled water circular means without immersing the electrode into cooling water. More stable chilling effects are attained by cooling the lower rotating electrode with chilled water flowing at a constant rate through a bearing for the lower rotating electrode and by cooling housings connected to the upper/lower rotating electrodes with chilled water.

A reference character "13c" in FIG. 3 is a V-shaped groove formed around an outer periphery of the lower rotating electrode 13b. As shown in the drawing, the noble metal wire 2 is guided by the V-shaped groove 13c and welded to a predetermined position on the spring base strip 1.

A reference numeral "52" is an upper power supply shaft supported by an upper housing 54 and the upper rotating electrode 13a is rotatably held by the upper power supply shaft 52. In the same manner, a lower power supply shaft 53 is supported by a lower housing 55 and the lower rotating electrode 13b is rotatably held by the lower power supply shaft 53. As shown in the drawing, the through-hole 51b for circulating chilled water is perforated in the lower power supply shaft 53 along its axis.

Figure 4A:
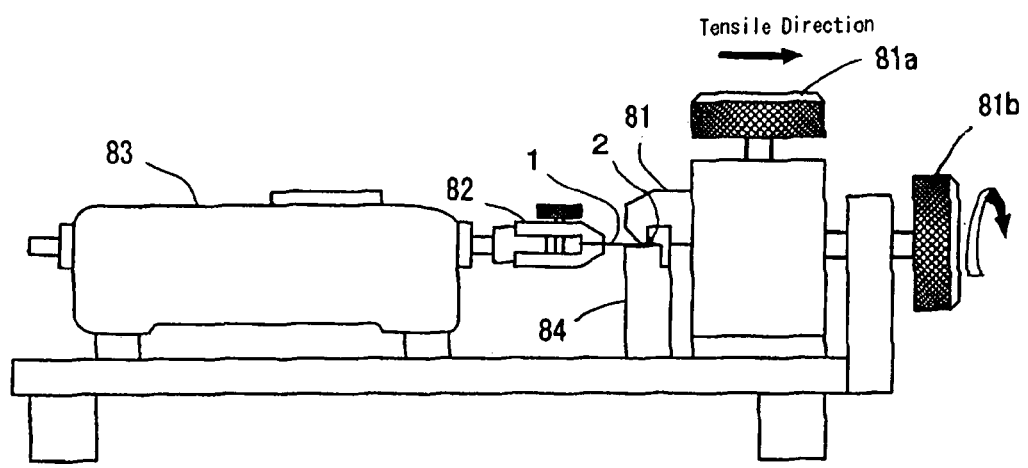
FIGS. 4(a) and 4(b) are outline views of a welded strength test machine.
Figure 4B:
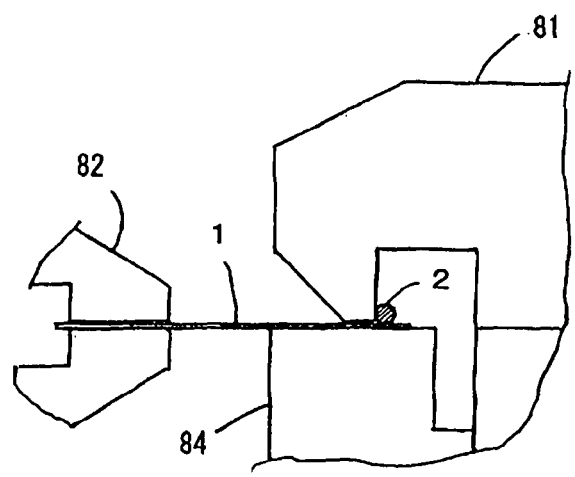

Hereinafter, the test machine for determine the strength of the welded part is explained as referring to FIGS. 4(a) and 4(b).

In order to determine the welded strength of the noble metal wire to the spring base strip appropriately, the special test machine is developed by the inventors. As illustrated in FIGS. 4(a) and 4(b), the noble metal wire 2 welded to the spring base strip 1 is hooked and pulled by a hooking device 81 arranged perpendicular to an axis of the noble metal wire 2, so that a strength to peel the noble metal wire 2 from the spring base strip 1 is measured as the welded strength.

As illustrated in the drawings, one end of the spring base strip 1 is horizontally held by a chucking device 82 such that the welded noble metal wire to the other end of the spring base strip is facing upward. The hooking device 81, which can be slid vertically, is lowered to a predetermined position by rotating a handle 81a. After the hooking device 81 is moved to a position where the hooking device is contacted with the side of the noble metal wire 2 by rotating a handle 81b, the handle 81b is further rotated in the same direction so that tensile force is loaded to the noble metal wire 2. The tensile force is measured and displayed in a physical dimension of [Kgf/2 mm] by a push and pull gauge. In this test machine, a hooked length of the noble wire 2 by the hooking device 81 is set at 2 mm. An indicator of the push and pull gauge shows a threshold value of the loaded tensile force during a loading process up to moment when the noble metal wire 2 is peeled from the spring base strip 1. The threshold value is determined as a ruptured strength of the welded part, namely, the welded strength.

Test results of the (ruptured) strength of the welded parts are as follows.

The ruptured strength (Kgf/2mm) of 1st to nth specimens at the beginning of a production lot are respectively as follows.

11.6, 11.5, 11.4, ~11.4, Average: 11.5, Maximum: 11.6, Minimum: 11.4

And the ruptured strength (Kgf/2mm) of 1st to nth specimens at the end of the same production lot are respectively as follows.

11.0, 10.8, 10.5~10.0, Average: 10.4, Maximum: 11.0, minimum: 9.9

Figure 5:
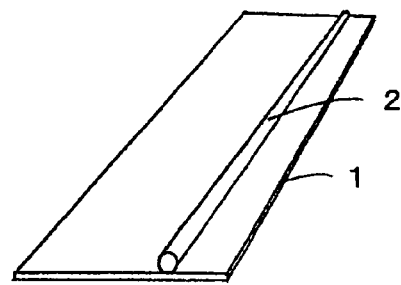
FIG. 5 is a perspective view showing a positional state of a noble metal wire welded to a spring base strip.
Figure 6A:
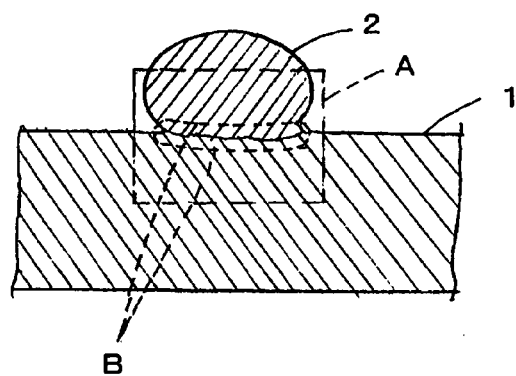
FIG. 6(a) is a cross sectional view showing a state of the noble metal wire welded on the spring base strip.

FIG. 5 is the perspective view showing a positional relation between the spring base strip 1 and the noble metal wire 2. FIG. 6(a) is the cross sectional view showing a combined state of the noble metal wire welded to the spring base strip. Area B surrounded by a broken line in FIG. 6(a) is a schematic image of the so-called nugget.

When different metals with different electric conductivities are welded together by the seam welding, it is important to form appropriate nuggets in order to obtain a sufficient strength in the welded parts. For that purpose, an optimum heat balance and an appropriate welding electric current are required. In the embodiments by the present invention, a heat balance among the noble metal wire, the spring base strip and the upper/lower rotating electrodes can be appropriately controlled, so that the welding electric current is controlled easily. As a result, the following facts are confirmed: a desired welded position of the noble metal wire to the spring base strip is attained and a predetermined strength in the welded part is obtained.

In the case of the seam welding, when a welding electric current with an appropriate cycle is intermittently added to the rotating electrode, the nuggets can be continuously formed during welding operations.

Figure 6B:
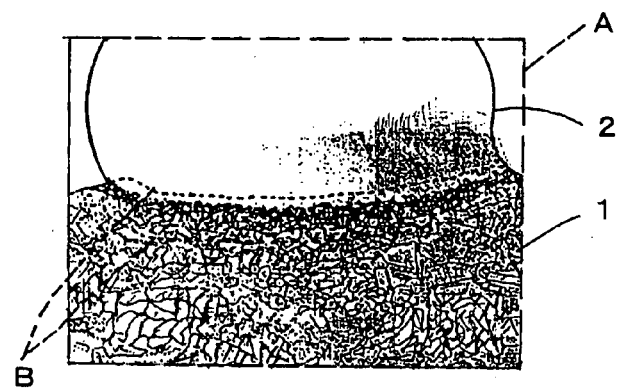
FIG. 6(b) is a schematic microscopic view showing a diffused welded state of a welded portion.

FIG. 6(b) is the enlarged schematic microscopic view of square area A in FIG. 6(a). FIG. 6(b) indicates a sufficiently diffused junction is formed in the welded portion.

Figure 7A:
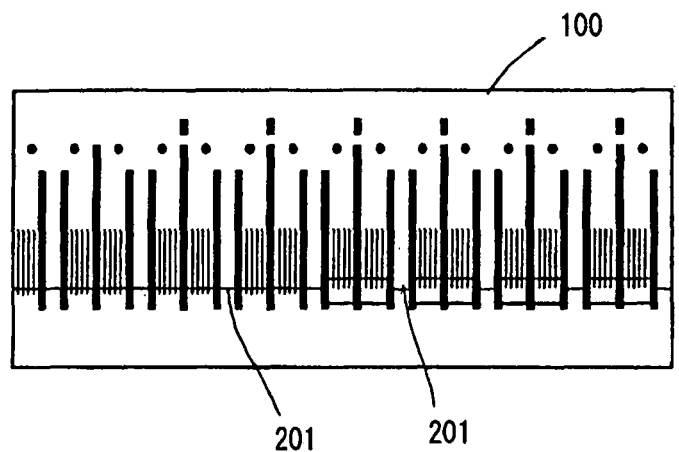
FIGS. 7(a) and 7(b) are views showing a contact member product produced by punching the contact members obtained by the method of the present invention.
Figure 7B:
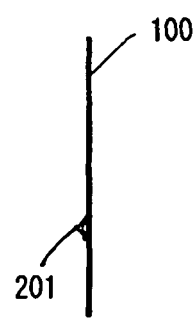

FIGS. 7(a) is the plan view showing an example of the contact member products punched from the semi-product produced by the method of the present invention. A reference numeral "100" in the drawing is a spring base strip and a reference numeral "201" is a noble metal wire. The example shown in FIG. 7(a) is a semi-product, which is punched in a desired pattern, but is not separated into respective contact member products yet. FIG. 7(b) is the side view.

Figure 8:
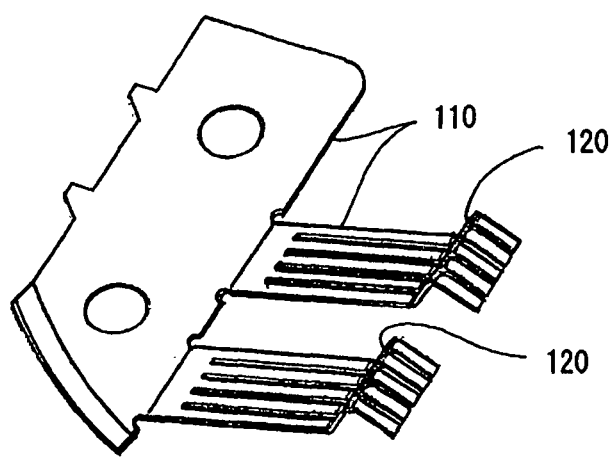
FIG. 8 is a perspective view showing another contact member product produced by punching the contact members obtained by the method of the present invention.

FIG. 8 is the perspective view showing another contact member product punched from the semi-product produced by the method of the present invention.

A reference numeral "110" in the drawing is a spring base strip and a reference numeral "120" is a noble metal wire.

Materials used in the present embodiment are as follows. A phosphor bronze (Sn: 8.24%, Fe: 0.091%, P: 0.31%, Zn: 0.11%, Cu etc.: balance) is used for the spring base strip 1 formed as a thin palate with a thickness of 0.08 mm-0.15 mm. An alloy with 7 elements (Pd: 30-36%, Ag: 30%, Cu: 14%, Au: 1o %, Pt: 10%, Ni: 1%, Zn: 1%) is used for the noble metal wire formed as a fine wire with a diameter of 0.07 mm-0.095 mm.

Since contact members produced from the above-mentioned members have excellent properties such as a sliding ability, an abrasion resistance, electrical output characteristics and the like compared with conventional contact members, contact pressures can be reduced by employing the contact members of the present invention, so that products of high quality with longer life can be realized.

Guiding holes, which are formed in conventional spring base strips in order to keep a sufficient preciseness of welded positions, are not required in the embodiments by the present invention. As a result, the system by the present invention is simplified in addition, a productivity of the contact members is remarkably raised and a sufficient preciseness of the welded position can be attained by the present invention.

As mentioned above, basically guiding holes are not necessary in the system by the present invention, but devices for the guiding holes on the spring base strips are freely arranged in the production system, if clients request.

The noble metal wire can be welded to the spring base metal in a longitudinal direction with a preciseness of ±0.02 mm as well as a strength of the welded part more than 5kgf/mm can be attained by the system of the present invention for producing the contact members used in electric/electronic circuits. The system can weld (by seam welding) the noble metal wire continuously to the spring base strip with a length more than 1500 m at a rate of 18 m/hr. Sufficient measures against generating heat during welding operations are taken by the closed chilled water circular means of the present invention.

What is claimed is:

1. A method for producing a contact member being employed in electric/electronic circuits comprising steps of:
   supplying a spring base strip;
   supplying a noble metal wire;
   welding said noble metal wire to said spring base strip by a seam welding utilizing upper and lower rotating electrodes as holding said spring base strip and noble metal wire between said upper and lower electrodes; and
   winding a welded product, wherein:
   said seam welding step comprises a step of setting welding conditions and a step of circulating chilled water in a closed channel with cooling water flowing through a through-hole of an upper housing of said upper rotating electrode and a through-hole perforated through a cooling shaft arranged as a rotating axis of said lower rotating electrode the method further comprising steps of:
   sampling specimens from said welded product at the beginning of a production lot and at the end of the same production lot;
   testing said specimens for determining a preciseness of a welded position of said noble metal wire to said spring base strip and a strength to peel said noble metal wire from said spring base strip by a test machine by a hooking device arranged perpendicular to an axis of said noble metal wire and contacting a side of the noble metal wire, and moving said hooking device away from the specimen in a direction parallel to the surface of the spring base strip; and
   confirming the values determined by said testing step fulfill predetermined standards.

2. A system for producing a contact members being employed in electric/electronic circuits comprising:
   a spring base strip supplying means;
   a noble metal wire supplying means;
   a seam welding means comprising upper and lower rotating electrodes for welding said noble metal wire to said spring base strip as holding said spring base strip and said noble metal wire between said upper and lower rotating electrodes;
   a winding means for winding a welded product, wherein:
   said seam welding means further comprises a setting means for setting welding conditions and a circulating means for circulating chilled water in a closed channel;
   said circulating means for circulating chilled water in the closed channel comprises:
   a closed pipeline for circulating chilled water via a through-hole formed in an upper housing of said upper rotating electrode and a through-hole perforated through a cooling shaft arranged as a rotating axis of said lower rotating electrode, and
   a chilling unit, wherein:
   the system further comprises a testing means for determining a preciseness of a welded position of said noble metal wire to said spring base strip and a strength to peel said noble metal wire from said spring base strip by a hooking device arranged perpendicular to an axis of said noble metal wire and contacting a side of the noble metal wire, wherein said hooking device moves away from the specimen in a direction parallel to the surface of the spring base strip, and wherein:
   specimens having predetermined dimensions are sampled at the beginning of and at the end of a production lot for determining the preciseness of the welded position of said noble metal wire to said spring base metal and the welded strength peel said noble metal wire from said spring base strip.

* * * * *